United States Patent [19]

Colombo

[11] Patent Number: 5,173,230
[45] Date of Patent: Dec. 22, 1992

[54] METHOD AND APPARATUS FOR PRODUCING PANELS

[75] Inventor: Gian C. Colombo, San Giorgio su Legnano, Italy

[73] Assignee: ICMA San Giorgio S.p.A., Italy

[21] Appl. No.: 604,232

[22] Filed: Oct. 29, 1990

[30] Foreign Application Priority Data

Oct. 31, 1989 [IT] Italy .................. 22235 A/89

[51] Int. Cl.$^5$ .................................. B29C 47/76
[52] U.S. Cl. ........................ 264/102; 264/211.23; 264/349; 425/203; 425/204
[58] Field of Search .............. 264/102, 101, 349, 211.21–211.23; 425/203, 204, 208, 209, 376.1

[56] References Cited

U.S. PATENT DOCUMENTS

| | | | |
|---|---|---|---|
| 3,376,603 | 4/1968 | Colombo | 425/203 |
| 4,228,116 | 10/1980 | Colombo et al. | 264/119 |
| 4,243,456 | 1/1981 | Cesano | 156/214 |
| 4,328,067 | 5/1982 | Cesano | 156/511 |
| 4,474,473 | 10/1984 | Higuchi et al. | 425/209 |
| 4,663,103 | 5/1987 | McCullough et al. | 425/204 |
| 4,708,623 | 11/1987 | Aoki et al. | 425/203 |
| 4,897,233 | 1/1990 | Bier et al. | 264/211.23 |
| 4,906,421 | 3/1990 | Plamthottam et al. | 425/203 |

FOREIGN PATENT DOCUMENTS

| | | | |
|---|---|---|---|
| 517911 | 10/1955 | Canada | 425/204 |
| 0058101 | 8/1982 | European Pat. Off. | 264/349 |
| 59-118438 | 7/1984 | Japan | 425/376.1 |
| 937204 | 6/1982 | U.S.S.R. | 425/204 |

OTHER PUBLICATIONS

"Twin Screw Extruders—A Separate Breed", Martelli, SPE Journal, Jan. 1971—vol. 27, pp. 25-30 . . .

*Primary Examiner*—Jeffery Thurlow
*Attorney, Agent, or Firm*—Wigman & Cohen

[57] ABSTRACT

Remoldable panels of a high melting point, high tenacity thermoplastic polymer and a thermosensitive organic filler are produced by forming a mixture of polymer and filler, extruding the mixture to form a web and calendaring the web prior to its solidification. The mixture is formed and extruded in a single step by separately feeding the polymer and the thermosensitive filler into an integral mixing and extruding space that has a feed end and an extrusion end and includes a pair of co-rotating parallel elongated elements. Each of the co-rotating parallel elements has a length extending between the feed end and the extrusion end of the integral space. At least three helical extrusion sections are distanced along the length of the elements and at least two kneading sections are included. The kneading sections and the extrusion sections of the elements are provided at positions along their length to form kneading zones and extrusion zones so as to provide one kneading zone between adjacent extrusion zones in the integral space. The polymer is introduced into the integral space in a first extrusion zone near the feeding end while the thermosensitive filler is introduced in a second extrusion zone closer to the extrusion end than the first extrusion zone. A venting means is connected to the extrusion zone nearest the extrusion end.

13 Claims, 3 Drawing Sheets

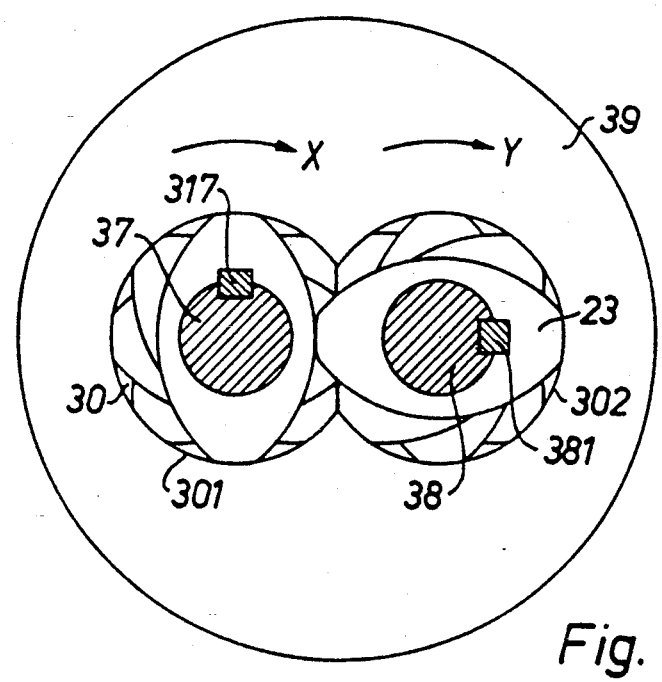
Fig. 3
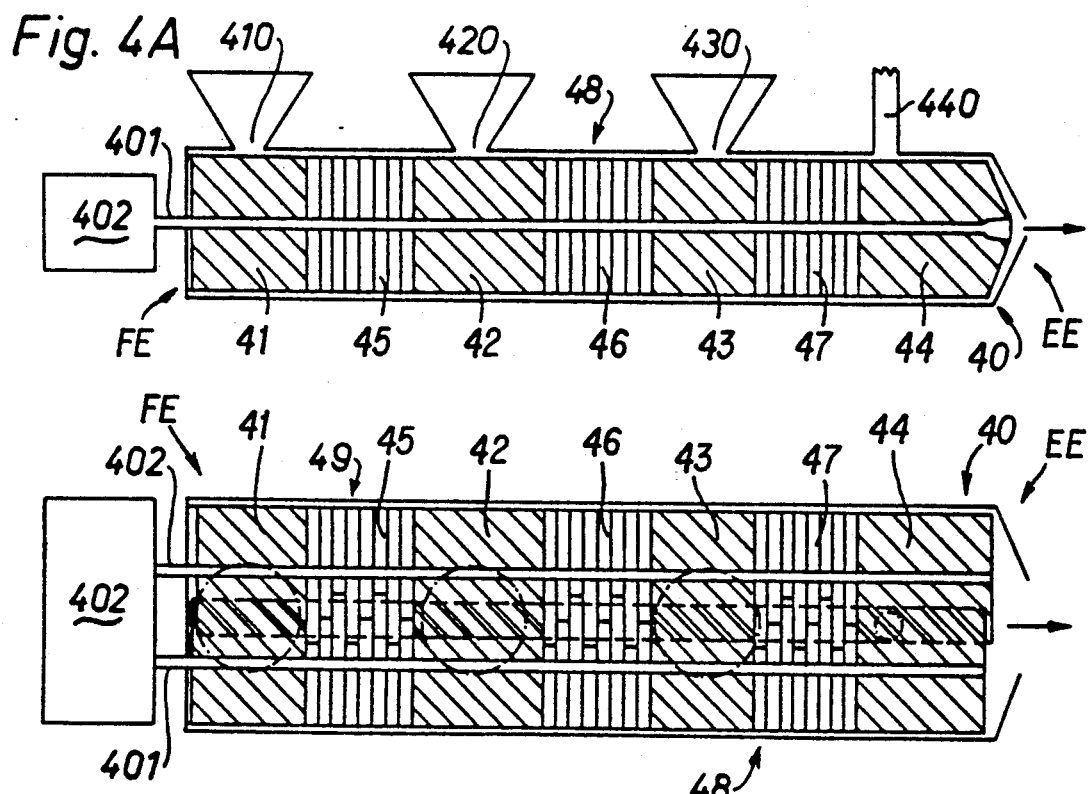
Fig. 4A
Fig. 4B

METHOD AND APPARATUS FOR PRODUCING PANELS

BACKGROUND OF THE INVENTION

1. Field of the Invention

The present invention relates to the art of processing polymer compositions and specifically to a method of producing remoldable self-supporting thin panels consisting essentially of a polymer/filler composition in which the polymer consists, at least in part, of a thermoplastic polymer having a softening temperature of above about 150° C. and wherein the filler consists, at least in part, of an essentially thermosensitive particulate organic material

2. Prior Art

Thin panels of this type are known per se and, typically, have a thickness between 1 and 5 mm, preferably between 1.5 and 3 mm. They are "self-supporting" in the sense of maintaining their shape under loads typical of their intended end use, such as when used as furniture components or as shaped panels in automobiles, e.g. as inner door casings; furthermore, they are "remoldable" in the sense that they can be shaped into most any required three-dimensional shape when heated or reheated to a thermoplastic state and processed in a conventional molding press, e.g. as disclosed in U.S. Pat. Nos. 4,243,456 and 4,328,067 with or without concurrent coating by lamination.

Such panels, in addition to their remoldability, must have a substantial mechanical strength combined with low weight while consisting essentially but of low-cost components These somewhat contradictory requirements can be met by using polymer/ filler compositions in which the polymer constituent imparts the required thermoplasticity combined with high mechanical strength (tenacity) while the filler should be capable of being used in substantial proportions, say 30 to 70 % by weight of the total composition, in combination with the polymer without impairing its essential characteristics and without adding much in terms of weight and costs Particulate, i.e. comminuted, wood of the type known as "wood flour" or "saw-dust" and other organic substances preferably of the cellulosic type are known to meet these requirements, notably when used with high tenacity polymers, such as typically polypropylene of the homo- or heteropolymeric and frequently isotactic kind. However, molecular structures that yield high tenacity polymers tend to have relatively high "softening temperatures", i.e. the temperature at which they can be processed in their thermoplastic state, and typical processing temperatures of such polymers are in the order of 180 to 220° C. Organic fillers of the cellulosic type, on the other hand, are not stable when exposed to such temperatures in that they tend to decompose at these temperatures and are termed "thermosensitive" herein for short to generally refer to organic fillers that would otherwise be suitable or desirable for use in production of panels because they meet the above aims but are degraded or decomposed at the processing temperatures dictated by the high tenacity polymers.

As is known, e.g. from U.S. Pat. No. 4,228,116, thermosensitive cellulosic fillers, such as saw dust, can be used for production of panels by the above described method if, prior to extrusion, an aggregated or agglomerated mixture ("premix") of particulate polymer and particulate filler is formed and if such mixture is introduced into the extruder. If the step of preparing the premix is omitted, the resulting extrudate tends to have insufficient coherence and/or has an uncontrolled cellular structure caused by voids that are formed due to inclusion of vapor bubbles of gaseous decomposition products including water that is strongly absorbed or chemically bound to the molecular structure of the organic filler within the polymer matrix around the filler particles.

OBJECTS AND BRIEF SUMMARY OF THE INVENTION

Accordingly, it is a main object of the present invention to provide for production of panels by a method as indicated above but without requiring a preliminary step of producing a premix of the polymer and the thermosensitive filler.

It has been found according to the invention that this aim can be achieved by a novel method which also provides further advantages, notably the option to add a second filler which may, but need not, be thermosensitive and/or a significantly reduced energy consumption while maintaining the advantage of directly processing the starting materials in a single step, i.e. without the need to produce a premix in a first process step and then extruding it in a subsequent stage of the process.

According to a first general embodiment the method according to the invention is characterized in that the mixture of high tenacity, high melting (softening temperature above 150° C.) thermoplastic polymer, such as a polypropylene composition, and the thermosensitive filler, such as finely comminuted wood (e.g. having a particle size of below 1 mm) and any further optional constituent (e.g. a pigment and/or a second filler that may be thermosensitive or not and be of normal or of the reinforcing type, such as mineral dust and fibrous materials including carbon fibers, glass fibers, etc.) is formed and extruded in a single step by feeding the thermoplastic polymer and the thermosensitive filler into an integral mixing and extruding space having a feeding end and an extrusion end and comprising a pair of co-rotating and mutually co-acting elongated elements arranged essentially in parallel and each having:

a length extending essentially between the feeding end and the extrusion end of the integral mixing and extruding space;

at least three feedingly effective helical extrusion sections mutually distanced along said length;

at least two essentially non-feeding kneading sections each of which is positioned between adjacent extrusion sections; the kneading sections and the extrusion sections of each of the elongated elements are located at radially adjacent positions along the length of each element so as to form, in the integral mixing and extruding space, at least two kneading zones and at least three extrusion zones and to provide one kneading zone between adjacent extrusion zones; and wherein a part, at least (and preferably all or at least a predominant portion, i.e. more than 50 % by weight thereof) of the high melting polymer is introduced into the integral mixing and extruding space in an area of a first extrusion zone located near the feeding end while a portion, at least, and preferably all or the major part of the thermosensitive filler is introduced into the integral mixing and extruding space at a portion thereof in the area of a second extrusion zone situated closer to the extrusion end than the first extrusion zone. Generally, the extrusion zone nearest the extrusion end is connected with a conventional venting means for removing gaseous constituents from the extruded mass.

BRIEF DESCRIPTION OF PREFERRED EMBODIMENTS

The terms "co-rotating" or "co-rotation" as used herein are intended to refer to rotation of both elongated elements in the same direction of rotation, preferably, but not necessarily, at substantially the same speed, typically in the range of from 50 to 500 rpm and preferably in the range of from about 100 to about 400 rpm depending to some extent upon the length/diameter ratio of the elongated elements. The meaning of "co-rotation" as used herein is the opposite of the rotation in conventional twin-screw extruders that are operated with counter rotating screws.

Each elongated element used according to the invention defines, when in rotation, an essentially cylindrical space having a length/diameter ratio (L/D) in the range of from 15:1 to 45:1, preferably 20:1 to 32:1 with typical diameters in the range of from about 40 mm to about 150 mm.

According to a generally preferred embodiment of the inventive method, the two elongated elements each define, when in rotation, cylindrical spaces of equal diameter; generally, the two rotation-defined cylindrical spaces will have at least some overlap, typically between 10 and 20 % of each diameter, and the integral mixing and extruding space used in the method according to the invention will preferably have a shape in general correspondence therewith, i.e. one defined by two parallel cylinders of equal diameter that overlap each other in a significant portion, e.g. with an overlap of 5 to 30 % and preferably 10 to 20 % of the diameter for each cylinder. Generally, the distance between the rotation-defined cylindrical spaces of the elongated elements and the integral mixing and extruding space will be small, e.g. in the range of from 0.2 to 2 mm.

The terms "feedingly effective" and "essentially non-feeding" as used herein in connection with the extrusion sections and the kneading sections are intended to indicate that the sections of the elongated elements so identified should cause (feeding), or not cause (non-feeding) significant motion of the mass within the extrusion space towards the extrusion end thereof. Kneader-generated local movement of the mass within the extrusion space in the opposite direction, i.e. toward the feeding end of the extrusion chamber, is not excluded but not preferred while significant and essentially circular turbulent motion caused by the kneader sections of the elongated elements in the kneader zones of the integral mixing and extruding space is believed to be most desirable. It is to be noted immediately that the mass within the integral mixing and extruding space will, of course, be in continuous motion both in the extrusion zones as well as in the kneading zones with a net motion of the mass from the feeding end to the extrusion end thereof.

Yet, while the extrusion sections of the elongated elements and the extrusion zones formed by them upon co-rotation should generate a strong momentum of motion of the mass towards the extrusion end and through the nozzle generally provided there, the kneading sections of the elongated elements and the kneading zones formed by them upon co-rotation should not significantly contribute to the forward momentum of the extruded mass.

"Non-feeding movement", in other words, may have any effect upon the mass processed within the extruder except that of forcing it into the direction towards the extrusion end. Absence or existence of a contribution to, the momentum of movement of the extruded mass by a given type of machine element can be easily determined by operating an isolated section (i.e. without adjacent screw-feeding elements) in a test installation and observing the resulting motion of a mass processed therein.

"Feedingly effective", on the other hand, is intended to indicate the result of co-rotating helical elements of the type used for extrusion of plastic, typically the screw-type rotating beams of conventional extruders. It should be noted that co-rotational extruders are known per se so that a detailed discussion of the extrusion section and zones is not required herein.

According to a preferred embodiment the inventive method comprises providing four feedingly effective helical extrusion sections and three interposed non-feeding kneading sections on each elongated element so as to produce a total of four extrusion zones with three kneading zones provided between them. If an additional constituent, e.g. a second filler, of the composition of the extruded panel is to be introduced into the integral mixing and extrusion space, this is done so in the area of an additional (fourth) extrusion zone separated by one (additional) kneading zone from the extrusion zone connected with the venting means.

According to a second general aspect, the invention provides an apparatus for carrying out the novel method; the apparatus comprises an integral mixing and extrusion chamber having a feeding end and an extrusion end and including a pair of elongated elements arranged essentially in parallel and each having:
 a length extending essentially between said feeding end and said extrusion end of said chamber;
 at least three feedingly effective helical extrusion sections mutually distanced along said length;
 at least two essentially non-feeding kneading sections each of which is positioned between adjacent extrusion sections;
each of said elongated elements defining, upon rotation, an essentially cylindrical space and both elements, upon rotation, defining two parallel and mutually overlapping cylindrical spaces; said kneading sections and said extrusion sections of each of said elongated elements being provided at radially adjacent positions along said length to form in said chamber at least two kneading zones and at least three extrusion zones so as to provide one kneading zone between adjacent extrusion zones; the chamber has a first opening in a first extrusion zone located near said feeding end for introducing said polymer into said chamber, a second opening in the area of a second extrusion zone situated closer to said extrusion end than said first extrusion zone for introducing the thermosensitive filler and a third opening for venting the integral mixing and extruding chamber in the third extrusion zone, i.e. that located nearest the extrusion end of the integral chamber.

If the apparatus is to be suitable for introducing a second filler, a fourth opening will be provided in the integral mixing and extruding chamber in an extrusion zone situated between the third and the second extrusion zone.

Generally, the apparatus according to the invention includes means for heating the integral mixing and extrusion chamber as well as drive means for co-rotation of the elongated elements as explained above. Such heating means and drives are conventional, however.

BRIEF EXPLANATION OF THE DRAWINGS

The invention will be explained in more detail with reference to the annexed drawings illustrating but not limiting the invention and wherein

FIG. 3 is a cross-sectional view of a non-feeding kneading section in an integral mixing and extruding space or chamber according to the invention;

FIGS. 4A and 4B are diagrammatic illustrations of a preferred embodiment of the integral mixing and extruding space or chamber according to the invention;

DETAILED DISCUSSION OF THE PREFERRED EMBODIMENTS

Figure 1A:
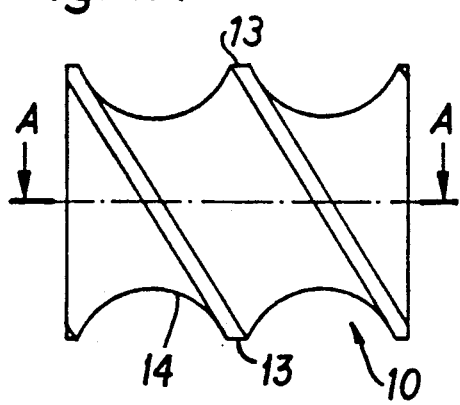
FIGS. 1A, 1B and 1C illustrate various views of a typical segment for forming the helical extrusion sections of the elongated elements according to the invention.
Figure 1B:
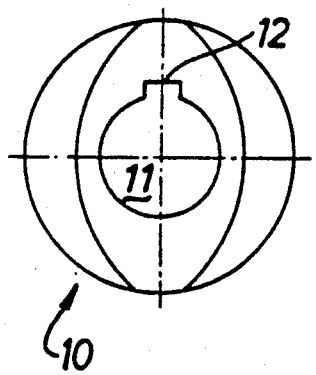
Figure 1C:
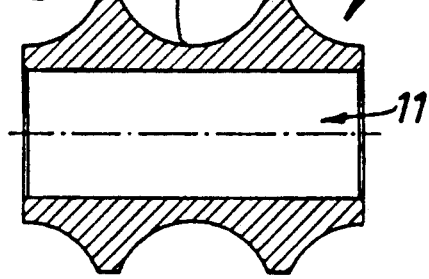

FIG. 1A is a side-view of a typical monolithic segment 10 for forming helical extrusion sections. Each segment 10 has a bore 11 provided with an elongated recess or groove 12 so that a sufficient number of segments 10 can be arranged on a shaft (not shown). The angle of the helical threads 13 as well as the shape and depth of the helical groove 14 are typical but are not considered to be critical, and proper selection is well within the knowledge of one skilled in the plastics extrusion art. Also, while segments 10 are shown with a double-helical thread, this is a matter of convenience. Generally, it is desirable that adjacently arranged segments 10 will form feedingly effective and, hence, sufficiently continuous extrusion sections of the elongated elements. As is apparent, FIG. 1C is a sectional view along line A—A of FIG. 1A while FIG. 1B is a front view.

Figure 2A:
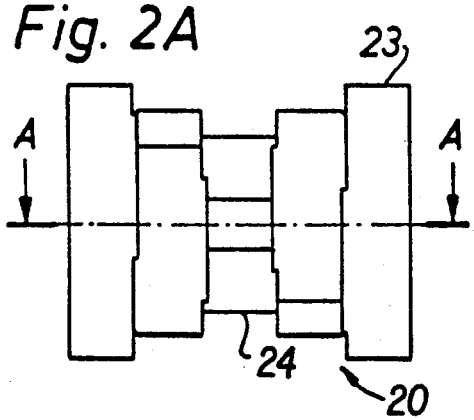
FIGS. 2A, 2B and 2C illustrate various views of a typical segment for forming the non-feeding kneading sections of the elongated elements according to the invention.

FIG. 2A is a side-view of a non-feeding kneading segment 20 that has a bore 21 and groove 22 of the same type as the helical segment 10. Again, a desired number of segments 20 can be arranged on the shaft (not shown) of the elongated element according to the invention. The shape as well as the dimension and displacement of the excenter portions 23 and the shape of the side faces 24 as shown are typical and preferred for many purposes but not believed to be critical.

Figure 2B:
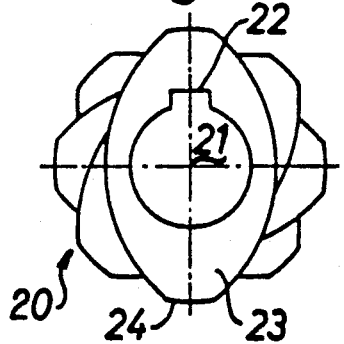
Figure 2C:
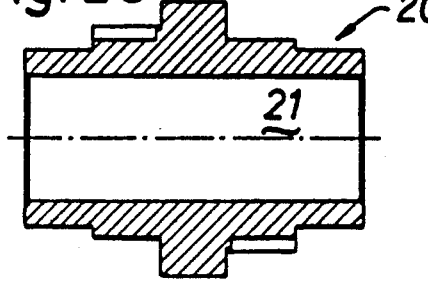

Again, the view of the kneader segment 20 shown in FIG. 2C is a sectional view along A—A, of the side-view of FIG. 2A while FIG. 2B is a front view.

FIG. 3 is a cross-sectional view of an integral mixing and extruding space or chamber 30 consisting of two joined and mutually overlapping cylindrical portions 301, 302 arranged within a housing 39 that will include conventional heating means (not shown).

Two shafts 37, 38 with an elongated securing ridge 371, 381 each rotate in the same direction as indicated by arrows X, Y and cause the excenters 23 to rotate and effect the essentially non-feeding kneading effect that will be generated by the elongated elements having kneading sections each composed of a predetermined number of segments 20 between adjacent helical extrusion sections each composed of a predetermined number of segments 10.

FIGS. 4A and 4B are schematic views of an integral mixing and extruding space 40 according to the invention. FIG. 4A is the side-view illustrating a preferred embodiment having four extrusion zones 41, 42, 43, 44 and three intermediate non-feeding kneading zones 45, 46, 47.

The extrusion zones and the kneading zones are formed by the pair of elongated elements 48, 49 extending from the feeding end FE to the extrusion end EE of integral space 40. The elements 48, 49 will co-rotate because of the action of shafts 401, 403 which, in turn, are actuated by a suitable drive means 402.

According to the invention, high tenacity, high melting polymer such as polypropylene will be introduced into the first feedingly effective helical extrusion section 41 via a first opening 410 near feeding end FE while thermosensitive filler will be introduced into the second feedingly effective section 42 via second opening 420 after the polymer has passed through the first non-feeding kneading section 45.

The mixture of polymer and filler is formed and homogenized in the second helical extrusion section 42 and the subsequent second non-feeding kneading section 46.

A preferred but optional further helical extrusion section 43 follows for optional introduction of a second filler, e.g. short fibers of mineral glass or the like via opening 430. On the other hand, the venting means 440 connected with the last or "third essential" helical extrusion section 44 nearest the extrusion end EE of space or chamber 40 is believed to be essential for most embodiments of the invention.

Figure 5:
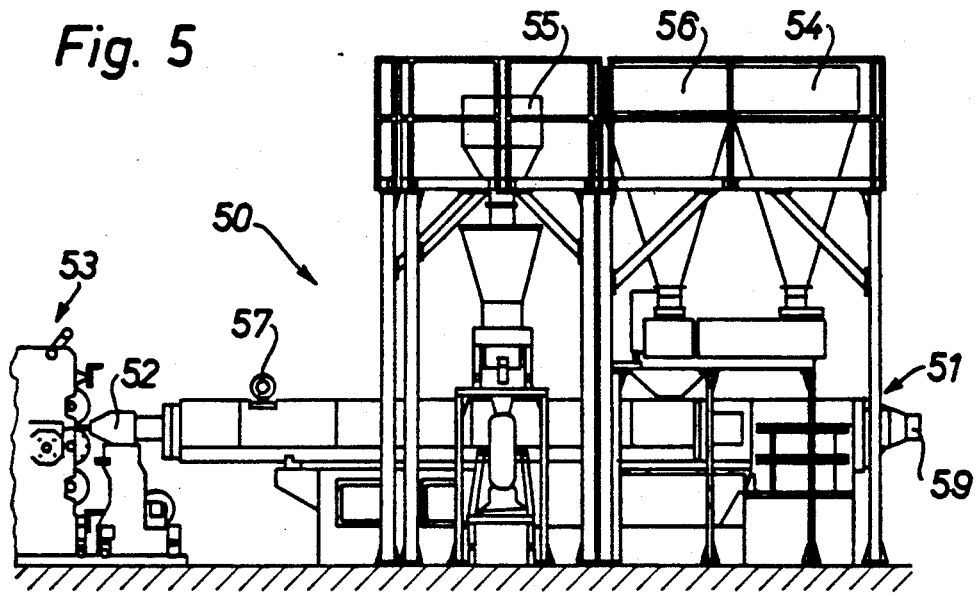
FIG. 5 is a side-view of an extrusion plant having an integral mixing and extruding space or chamber according to the invention.

FIG. 5 is a semi-diagrammatic side-view of the mixing and extruding portion of a plant 50 for continuous production of panels according to the invention showing the integral mixing and extruding unit 51 that produces a continuous web of the hot and thermoplastic mixture of polymer and filler via a conventional slot nozzle 52. The extruded web is fed into a conventional calender and then passed through a cooling zone (not shown) to a cutter (not shown), Typical panels produced by a plant of the type shown in FIG. 5 have a typical thickness in the range of from about 1.5 to 4.5 mm, a width of from 500 to 2000 mm and any desired length depending upon the setting of the web cutter.

The integral mixing and extruding unit 51 according to the invention is actuated by a motor 59 that drives the pair of elongated elements (not shown in FIG. 5) previously explained.

Granular polypropylene and/or granulated scrap of a polypropylene/filler mixture is fed into unit 51 via hopper 54 (including a dosage control means not shown) while the thermosensitive filler (wood flour, particle size below 1 mm) is supplied via hopper 55 (again with a dosage control means not shown). An optional further constituent, e.g. short glass fibers, can be introduced via hopper 56.

A conventional venting means 57 is connected with unit 51 near its extrusion end, i.e. that near nozzle 52.

Figure 6:
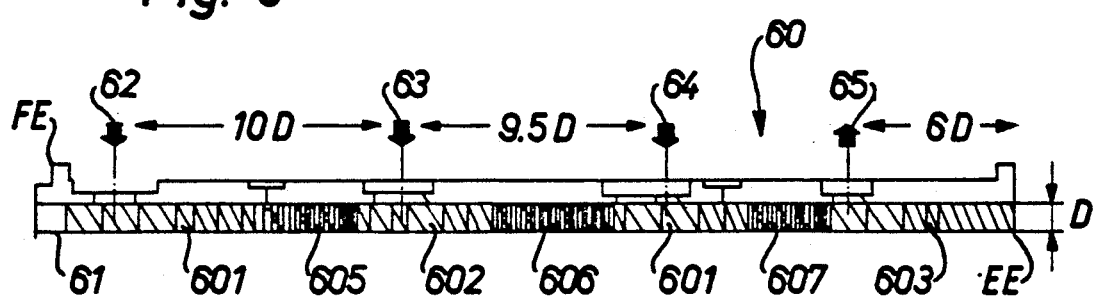
FIG. 6 is a length diagram.

FIG. 6 is a diagrammatical view of an elongated element 60 extending from the feeding end FE of a space or chamber 61 to the extrusion end EE thereof. Polymer is introduced at 62 in the area of a first extrusion zone 601 near the feeding end FE and passes through the first non-feeding kneading zone 605.

At a distance of typically about 10 diameters D, the thermosensitive filler will be introduced into the second extrusion zone 602 and pass, with the plastified polymer, through the next kneading zone 606. If an additional filler is introduced, this should be done at some distance from the opening where the thermosensitive filler is introduced, typically at a distance that is almost as great as that between the entry of the polymer and the entry of the thermosensitive filler, e.g. 9.5 diameters.

Another non-feeding kneading zone 607 follows before the extruder mass reaches the last extrusion zone 603 nearest the extrusion end EE. Preferably, this last or "third" (i.e. third essential) extrusion zone should have a length that is about equal to the length of the first extrusion zone 601, i.e. about 6 diameters.

Preferably, the length of the second kneading zone 606 is greater than that of any other kneading sections, e.g. 4 to 5 diameters.

Many modifications of the above examples will be apparent to one experienced in the art and the scope of the invention is not to be understood as limited to any specific example given herein for illustration.

What I claim is:

1. The method of producing remoldable self-supporting thin panels consisting essentially of a polymer/filler composition in which said polymer consists, at least in part, of a thermo-plastic polymer having a softening temperature of above 150° C. and wherein said filler consists, at least in part, of a thermosensitive particulate organic material; said method comprising the steps of:
   (a) forming a mixture of said polymer and said filler wherein said polymer is polypropylene and said thermosensitive filler is wood, and wherein substantially all of said thermosensitive filler is added downstream of the first extrusion zone and of the first kneading zone;
   (b) extruding said mixture to form a web; and
   (c) calendaring said web prior to its solidification;
wherein said mixture is formed nd extruded in a single step by feeding said thermoplastic polymer and said thermosensitive filler into an integral mixing and extruding space having a feeding end and an extrusion end and comprising a pair of co-rotating and mutually co-acting elongated elements arranged essentially in parallel and each having:
   a length extending essentially between said feeding end and said extrusion end of said space;
   at least three feedingly effective helical extrusion sections mutually distanced along said length;
   at least two essentially non-feeding kneading sections each of which is positioned between adjacent extrusion sections;
wherein said kneading sections and said extrusion sections of each of said elongated elements are provided substantially at radially adjacent positions along said length to form in said space at least two kneading zones and at least three extrusion zones so as to provide one kneading zone between adjacent extrusion zones; and wherein a part, at least, of said polymer is introduced into said space at a portion thereof in the area of a first extrusion zone located near said feeding end while a portion, at least, of said thermosensitive filler is introduced into said space at a portion thereof in the area of a second extrusion zone situated closer to said extrusion end than said first extrusion zone.

2. The method according to claim 1 wherein the extrusion zone nearest the extrusion end of said space is connected with a venting means for removing vapors formed within said space.

3. The method according to claim 1 wherein each of said elongated extrusion elements comprises four of said extrusion sections and three of said non-feeding kneading sections.

4. The method according to claim 2 wherein at least one additional constituent is introduced into said integral mixing and extrusion step in an area of an extrusion section situated next to said extrusion zone that is connected with said venting means.

5. The method according to claim 1 wherein said thermoplastic polymer is selected from polymers and copolymers of propylene and wherein said thermosensitive filler consists essentially of finely comminuted wood.

6. Apparatus adapted for producing remoldable self-supporting thin panels from a high tenactity polymer having a softening temperature above 150° C. and from at least one thermosensitive organic filler by forming a mixture of said polymer and said filler, extruding said mixture to form a web and calendaring said web prior to its solidification; said apparatus comprising:
   an integral mixing and extrusion chamber having a feeding end and an extrusion end and including a pair of elongated rotatable elements arranged essentially in parallel and each having:
   a length extending essentially between said feeding end and said extrusion end of said chamber;
   at least three feedingly effective helical extrusion sections mutually distanced along said length;
   at least two essentially non-feeding kneading sections each of which is positioned between adjacent extrusion sections;
   each of said elongated elements defining, upon rotation, an essentially cylindrical space and both elongated elements defining, upon rotation, two parallel and mutually overlapping cylindrical spaces;
   said kneading sections and said extrusion sections of each of said elongated elements being provided at radially adjacent positions along said length to form at least two kneading zones and at least three extrusion zones so as to provide one kneading zone between adjacent extrusion zones;
said chamber having a first opening in a first extrusion zone located near said feeding end adapted for introducing said polymer into said chamber; a second opening in the area of a second extrusion zone situated closer to said extrusion end than said first extrusion zone adapted for introducing all of said thermosensitive filler downstream of said polymer feed; and a third opening in the extrusion zone nearest said extrusion end of said integral chamber adapted for venting the same, wherein said polymer is polypropylene and said filler is wood.

7. The apparatus of claim 6 wherein each of said elongated extrusion elements comprises four of said screw-feeding sections and three of said intermediate non-feeding kneading sections.

8. The apparatus of claim 6 comprising at least one additional opening for introducing a further constituent int said extrusion chamber in an area of a screw-feeding section next to said extrusion zone nearest said extrusion end.

9. The method according to claim 2 wherein each of said elongated extrusion elements comprises four of said extrusion sections and three of said non-feeding kneading sections.

10. The method according to claim 3 wherein at least one additional constituent is introduced into said integral mixing and extrusion step in an area of an extrusion section situated next to said extrusion zone that is connected with said venting means.

11. The method according to claim 9 wherein said thermoplastic polymer is selected from polymers and copolymers of propylene and wherein said thermosensitive filler consists essentially of finelycomminuted wood.

12. The method according to claim 10 wherein said thermoplastic polymer is selected from polymers and copolymers of propylene and wherein said thermosensitive filler consists essentially of finely comminuted wood.

13. The apparatus according to claim 7 comprising at least one additional opening for introducing a further constituent into said extrusion chamber in an area of a screw-feeding section next to said extrusion zone nearest said extrusion end.

* * * * *